United States Patent
Kumar et al.

(10) Patent No.: US 9,719,417 B2
(45) Date of Patent: Aug. 1, 2017

(54) METHOD AND SYSTEM FOR SEQUESTERING CARBON DIOXIDE AND PRODUCING HYDROGEN GAS

(71) Applicant: THE FLORIDA INTERNATIONAL UNIVERSITY BOARD OF TRUSTEES, Miami, FL (US)

(72) Inventors: Sushant Kumar, Miami, FL (US); Vadym Drozd, Miami, FL (US); Andriy Durygin, Miami, FL (US); Surendra K. Saxena, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 271 days.

(21) Appl. No.: 14/559,699

(22) Filed: Dec. 3, 2014

(65) Prior Publication Data
US 2015/0152784 A1   Jun. 4, 2015

Related U.S. Application Data

(60) Provisional application No. 61/911,337, filed on Dec. 3, 2013.

(51) Int. Cl.
| | |
|---|---|
| B01D 53/04 | (2006.01) |
| F02C 3/28 | (2006.01) |
| B01D 53/62 | (2006.01) |
| C01B 31/20 | (2006.01) |
| C01G 49/00 | (2006.01) |
| C01G 49/06 | (2006.01) |
| C01G 49/08 | (2006.01) |
| C01B 3/14 | (2006.01) |

(Continued)

(52) U.S. Cl.
CPC ............ *F02C 3/28* (2013.01); *B01D 53/62* (2013.01); *B01D 53/96* (2013.01); *C01B 3/14* (2013.01); *C01B 31/20* (2013.01); *C01G 49/00* (2013.01); *C01G 49/06* (2013.01); *C01G 49/08* (2013.01); *F01K 13/00* (2013.01); *F01K 23/064* (2013.01); *F01K 23/10* (2013.01); *B01D 2253/1124* (2013.01); *B01D 2253/304* (2013.01); *B01D 2255/20738* (2013.01); *B01D 2257/504* (2013.01); *B01D 2258/025* (2013.01); *C01P 2002/72* (2013.01); *C01P 2002/88* (2013.01); *F05D 2220/722* (2013.01); *F05D 2260/611* (2013.01); *Y02C 10/04* (2013.01); *Y02E 20/16* (2013.01); *Y02E 20/18* (2013.01); *Y02E 20/185* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 2009/0158701 A1* | 6/2009 | Hoffmann | F01K 23/068 60/39.12 |
| 2012/0129246 A1* | 5/2012 | Fradette | B01D 53/1493 435/266 |

* cited by examiner

*Primary Examiner* — Anita Nassiri Motlagh
(74) *Attorney, Agent, or Firm* — Marshall, Gerstein & Borun LLP

(57) ABSTRACT

A system and method for the simultaneous sequestration of CO2, production of hydrogen, and production of electricity at any iron and steel industries is described. In one illustrative example, the raw materials particularly used in a blast furnace can also be used for locking CO2 gas in the form of siderite. Siderite, thus formed, can be decomposed to generate pure CO2 gas. Eventually, the generated pure CO2 gas can be sequestered underground, sold or used for oil gas recovery or for other applications.

14 Claims, 6 Drawing Sheets

(51) Int. Cl.
*F01K 13/00* (2006.01)
*F01K 23/06* (2006.01)
*F01K 23/10* (2006.01)
*B01D 53/96* (2006.01)

| Temperature (°C) | Pressure (bars) | Time (h) | % Conversion |
|---|---|---|---|
| 100 | 25 | 3 | 0.16 |
| 100 | 50 | 1 | 0.16 |
| 100 | 50 | 3 | 0.22 |
| 100 | 50 | 6 | 0.43 |
| 200 | 10 | 1 | 0.44 |
| 200 | 10 | 3 | 0.57 |

FIGURE 4

METHOD AND SYSTEM FOR SEQUESTERING CARBON DIOXIDE AND PRODUCING HYDROGEN GAS

RELATERD APPLICATIONS

This application claims priority benefit of U.S. Provisional Application No. 61/911,337 filed Dec. 3, 2013, the disclosure of is incorporated by reference herein in its entirety.

FIELD OF THE DISCLOSURE

This disclosure relates in general to a method and system for sequestering carbon dioxide and producing hydrogen gas, and more specifically, to a system and process for substantially simultaneously sequestering carbon dioxide and producing hydrogen gas in industries such as the iron and steel industries, as well as producing electricity.

BACKGROUND OF THE INVENTION

Iron and steel continue to be essential in today's society. The global steel production has been growing rapidly, from 1248 Mt in 2006 to 1490 Mt in 2011, an increase of about 16% in a short span of 5 years. Steel production is an energy intensive process and thus consumes huge amount of fossil fuels. Each ton of steel production emits 2.2 ton of $CO_2$ as a world average. While, many developed countries discharges 1.8 ton $CO_2$ for 1 ton of steel. Therefore, iron making industries can be seen as one of the biggest targets next to power plants to curb vast emission of greenhouse gases.

There is a need to develop innovative solutions to reduce the emissions from iron and steel industries.

Blast furnaces can produce hot metal iron (Fe) at costs competitive with other iron making technologies, and are predicted to survive through the next millennium. The biggest drawback of blast furnaces is the inevitable production of $CO/CO_2$ gases, as iron is reduced from iron oxide using carbon. For a ton of iron to be made, about 1.5 ton of CO2 gas is emitted into the atmosphere. The conventional approaches of capturing $CO_2$ from blast furnace as add-on technologies (i.e. without any modification of blast furnace) can be broadly classified as: (i) direct capture from blast furnace and (ii) capture after conversion of CO to $CO_2$. Latter approach can provide high $CO_2$ capture rates.

One such conventional method of $CO_2$ absorption at iron industries is through the use of mono ethanol amine (MEA) solution. MEA solvents based absorbents have been criticized because of their low absorption capacity, corrosive nature, and fast degradation of absorption capacity in the presence of exhaust gas. The MEA based chemical absorption method also requires several pretreatment steps in order to strip off undesirable chemical compounds which leads to a very high capture costs, which can be estimated at around $60/ton of $CO_2$. The regeneration of this solution also demands energy and thus eventually results in a high cost and energy intensive process. At the same time, it is evident that the steel industries, being limited by the laws of thermodynamics, have very little left to improve their energy efficiency. Thus, further large reductions in $CO_2$ emissions are not possible just by using existing technologies.

The production of iron and steel will most likely continue to be dependent on the use of fossil fuels for the foreseeable future, and it may not be viable either economically or environmentally. Some background patents include, US Patent Pub. No. 2012/0032378 A1, M. D. Lanyi, J. A. Terrible, entitled "Blast Furnace Iron Production with Integrated Power Generation"; US Patent Pub. No. 2012/0225007 A1, A. A. Park, L. S. Fan, H. R. Kim, entitled "Methods and systems for synthesizing iron-based materials and sequestering carbon dioxide"; and U.S. Pat. No. 4,917,727, H. Hotta, M. Matsuura, Y. Oono, H. Saito, entitled "Method of operating a blast furnace." Some related publications include, K. Svoboda, G. Slowinski, J. Rogut, D. Baxter. Thermodynamic possibilities and constraints for pure hydrogen production by iron based chemical looping process at lower temperatures, *Energy Conversion and Management* 48 (2007) 3063-3073 and $CO_2$ capture in industries and distributed energy systems: possibilities and limitations, Takeshi Kuramochi, 2011.

SUMMARY OF THE INVENTION

Embodiments of the disclosure provide a novel reaction to capture CO2 gas and which when integrated, can also produce useful hydrogen gas at a blast furnace site. The proposed reaction uses a mixture of magnetite and iron to capture CO2 gas from a blast furnace. The mixture of magnetite and iron readily adsorbs CO2 gas and forms siderite. Siderite, thus formed, needs to be decomposed to get pure CO2 gas. Pure CO2 gas can either be sold or buried underneath. This process has a great potential to alleviate the high cost and severe energy penalty, which otherwise are associated with the other proposed methods.

Embodiments of the disclosure can aid in reducing greenhouse gas emissions and high carbon capture costs of manufacturing process such as in the iron and steel industries.

In accordance with embodiments of the disclosure, a system of reactions can utilize blast furnace gas, mixture of iron and iron oxides and water to produce $H_2$ and sequester $CO_2$. In one embodiment, blast furnace gas is utilized to produce hydrogen by well-known water gas shift reaction, blast furnace gas can have an approximately equal percentage (by concentration) of CO and $CO_2$ gas. In various embodiments, hydrogen can advantageously be produced cheaply with no carbon release in the atmosphere and can even be consumed for hydride production or serve as an energy carrier.

In accordance with another embodiment of the disclosure, a method of sequestering $CO_2$ can include using a mixture of iron and iron oxide.

In still another embodiment of the disclosure, $CO_2$ lean gas (hot and pressurized) can be utilized to generate electricity using combined steam and gas power cycle. It is contemplated that embodiments of this disclosure can be used in iron industries, as well as can be extended to any existing or future coal-fired power plant equipped with $CO_2$ capture process.

BRIEF DESCRIPTION OF THE DRAWINGS

FIG. 4 illustrates the percent (%) conversion of magnetite and iron mixture to siderite at various temperature, pressure and time in accordance with an embodiment of the disclosure;

DETAILED DESCRIPTION

Figure 1:
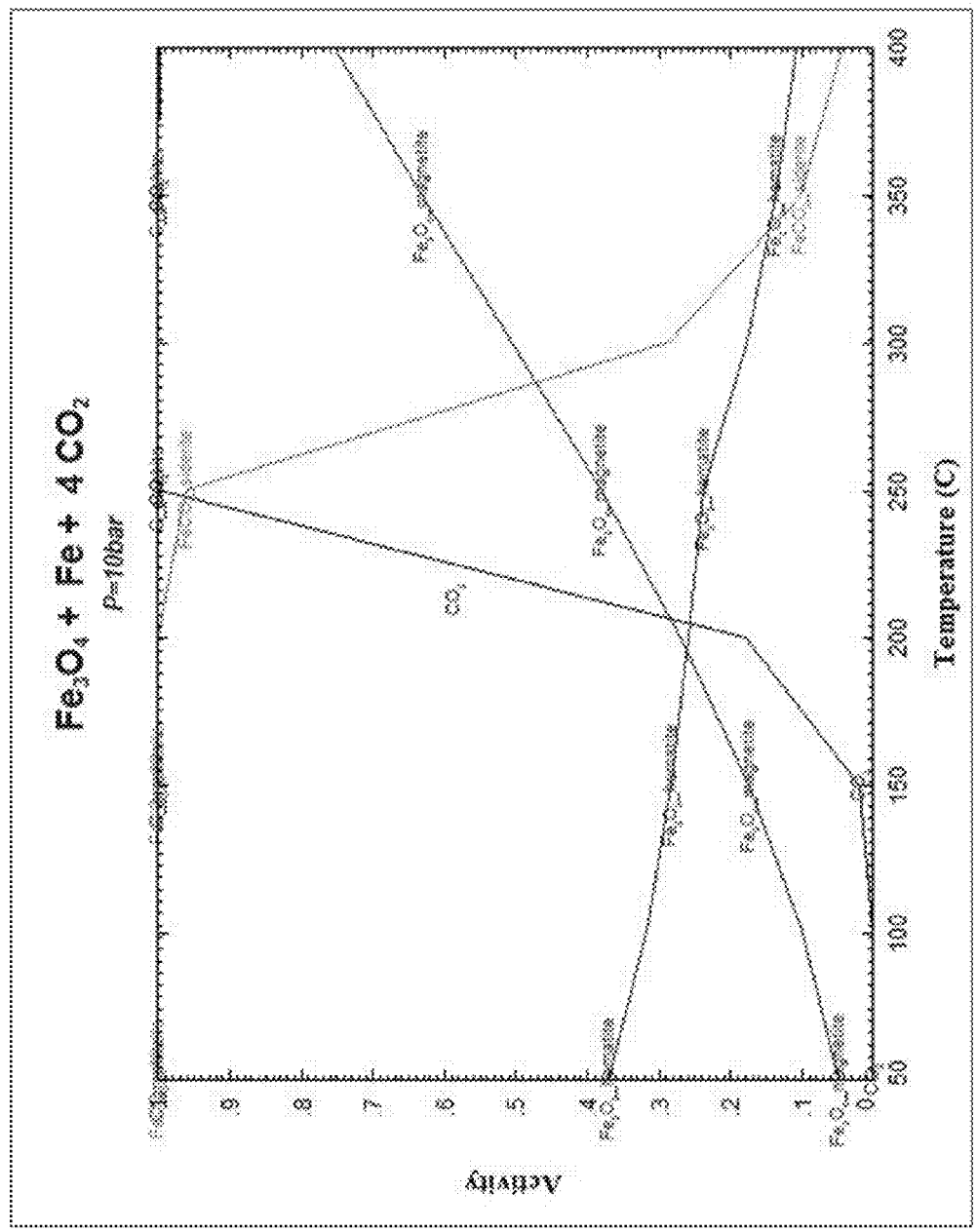
FIG. 1 shows equilibrium activity of siderite produced when magnetite and iron are allowed to react with $CO_2$ at various temperatures and constant pressure (10 bars)

Embodiments of the disclosure can advantageously allow for sequestering of carbon simultaneously with production by iron-based materials, such as materials that can be readily accessible at iron and steel industrial sites. These raw materials that can be used for the capture process, can be utilized for a large number of cycles. Further in various embodiments, once the sorbent capacity of the raw material degrades, the raw material can be used in further processing. For example, the raw material can be processed in a blast furnace for the production of iron or steel. Thus, embodiments of the invention can advantageously reduce or even eliminate loss of raw materials. Moreover, this system and method can be more thermodynamically favorable and thus can save energy. Embodiments of the disclosure can achieve one or more additional advantages including, but not limited to, eliminating the use of hazardous materials in the sequestering process, a reduction in transportation and material handling cost, and relatively easy integration to any iron making industries. Embodiments of the disclosure can also provide the ability to use on-site generated electricity to run various other operations.

Embodiments of the disclosure include systems and methods, including, for example, using a series of reactions, for the substantially simultaneous production of hydrogen, sequestration of CO2, and production of electricity at any iron and steel industries. In embodiments utilizing a blast furnace, the raw materials used in a blast furnace can also be used for locking $CO_2$ gas in form of siderite. Siderite, thus formed, can be decomposed to generate pure $CO_2$ gas. Eventually, the generated pure $CO_2$ gas can be sequestered underground, sold or used for oil gas recovery. Some embodiments of the disclosed subject matter include methods and systems for sequestering $CO_2$ and generating $H_2$ as well as electricity. Embodiments of the methods and systems according to the disclosed subject matter can include an iron-oxide based carbon sequestration process and use of combined steam and gas power cycles to generate electricity. Pure $CO_2$ gas can be sequestered, sold or used for oil gas recovery. Hydrogen gas produced in the system can be fully utilized for any other purpose such as formation of any metal hydrides for automobile use.

As shown in equations [1] below, mixture of magnetite and iron can be used to capture $CO_2$ and produce carbonates. These carbonates can regenerate back the oxides, for the next capture cycle (equation [2]). Decomposition of carbonates is endothermic in nature while carbonation reaction is highly exothermic. Thus, thermodynamics highly favors the overall reaction route.

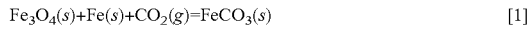

$$Fe_3O_4(s)+Fe(s)+CO_2(g)=FeCO_3(s) \quad [1]$$

$$\Delta H(200° C.,10bars)=-288.55 kJ/mol$$

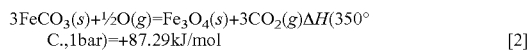

$$3FeCO_3(s)+\tfrac{1}{2}O_2(g)=Fe_3O_4(s)+3CO_2(g) \Delta H(350° C.,1bar)=+87.29 kJ/mol \quad [2]$$

Here, reaction equation [1] is exemplified using a mixture of iron and magnetite. However, different combination of iron based materials (such as: (i) $Fe_3O_4$+Fe (ii) $Fe_2O_3$+Fe, and (iii) FeO); which can produce iron(II) oxide (FeO, wustite) can be used as well. Iron metal in the form of powders or chips can be employed. For example, convention iron powders can be used. For example, conventionally, iron powders can be formed using sponge-iron or water-atomizing process. As an alternative or in addition to the use of pure iron metal, any industrial waste containing iron can be utilized.

It is shown in FIG. 1 that reaction [1] has definite advantages being a highly exothermic carbon-sequestration process. Reaction [1] can be run at a low temperature such as 100° C. to 200° C. An efficient recovery of heat from reaction [1] could be an additional benefit. The equilibrium thermodynamic calculation shows that siderite decomposes around 300° C. at 10 bars pressure. The stability of siderite increases with increase in pressure of $CO_2$.

Figure 2:
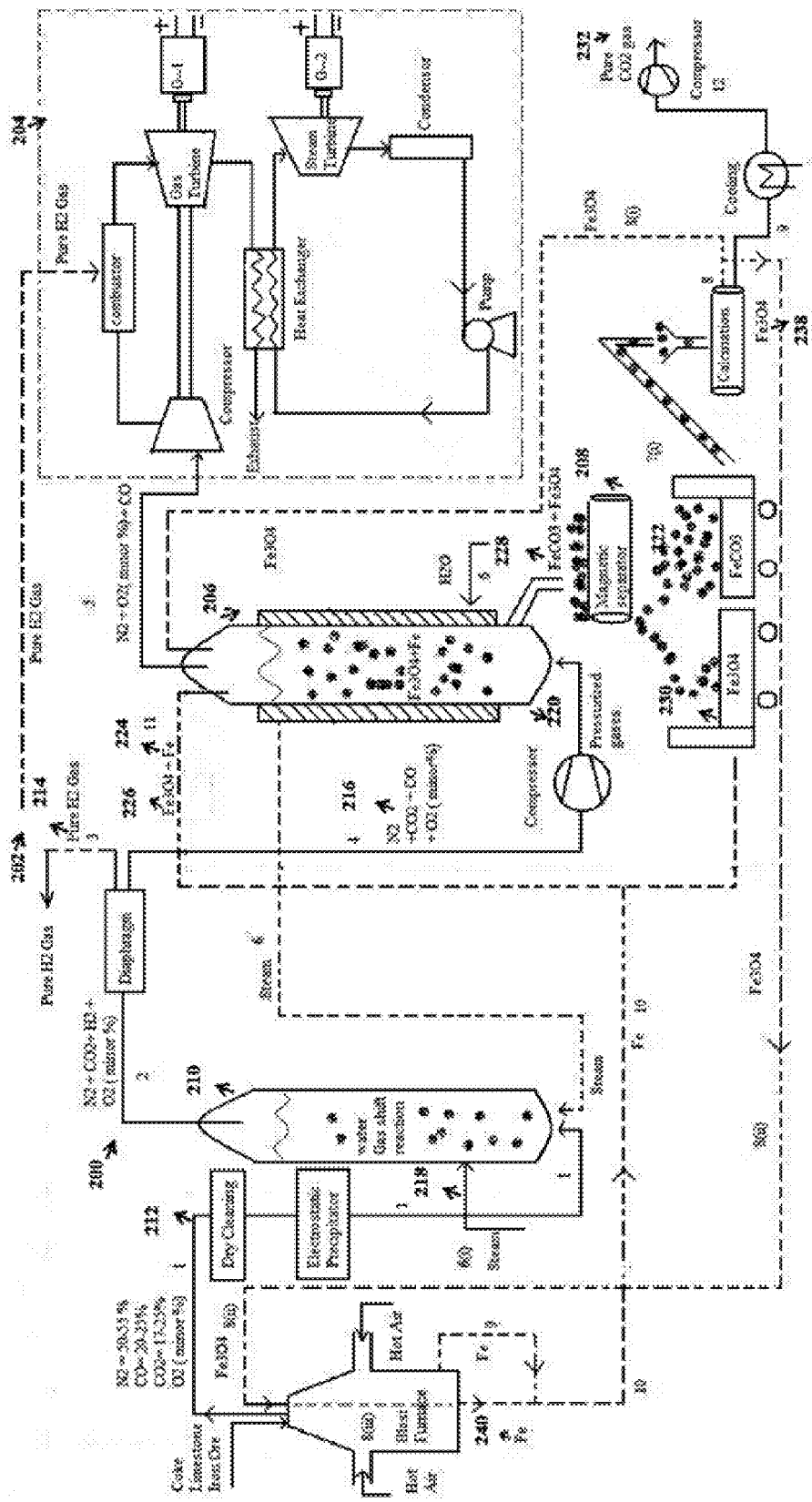
FIG. 2 is a schematic diagram of a system according to some embodiments of the disclosure.

Referring now to FIG. 2, some embodiments of the disclosed subject matter include a system 200 for sequestering carbon dioxide and generating hydrogen as well as electricity. System 200 includes a water gas shift reaction module or subsystem 210. System 202 which is a subset of system 200, includes carbonation module or reactor 206, a calcination module or calciner 208, and energy producing module or subsystem 204.

Water gas shift reaction module 210 uses blast furnace gas 212 and steam 218 to produce hydrogen 214 and $CO_2$ rich-gas stream 216. A part of the heat required to produce steam for water gas shift reaction module could even be supplied by the exothermic heat of reaction [1]. The kinetics of water gas shift reaction can be accelerated using iron oxides as catalysts.

In some embodiments, carbonation module 206 includes carbonation reactor 220 and calcination reactor 222. In carbonation reactor 220, $CO_2$ rich-gas stream 216 can reacts with iron 224 and magnetite 226 to form siderite 228. Calcination module 208 calcines siderite 228 in calcination reactor 222 to regenerate magnetite 230 and pure $CO_2$ gas 232. The regenerated magnetite 230 can be sent back to the carbonation reactor 220 to further capture $CO_2$ gas. Part of the magnetite can be directed to blast furnace 238 to generate iron 240. Here, the absorptive capacity of magnetite for $CO_2$ sequestration can last for several number of capture cycles. Once the capacity degrades, the magnetite can be sent to the blast furnace 238 to generate iron 240. As compared to conventional technologies, embodiments of the disclosure can reduce or eliminate the loss of raw materials. Advantageously, the system/method of embodiments of the disclosure can reduce the carbon capture cost.

In some embodiments, system 204 includes a combined gas and steam power cycle. Hot and pressurized $CO_2$-lean gas stream coming out of the carbonation reactor 220 can be used for the electricity generation using combined gas and steam power cycle. In this embodiment the hot and pressurized $CO_2$-lean gas stream can be in the range of 100° C. to 150° C. and pressure can be in the range of 7 to 8 bars. The electricity generated at any iron and steel industry site can significantly reduce the power costs otherwise needed to run various other operations.

Figure 3:
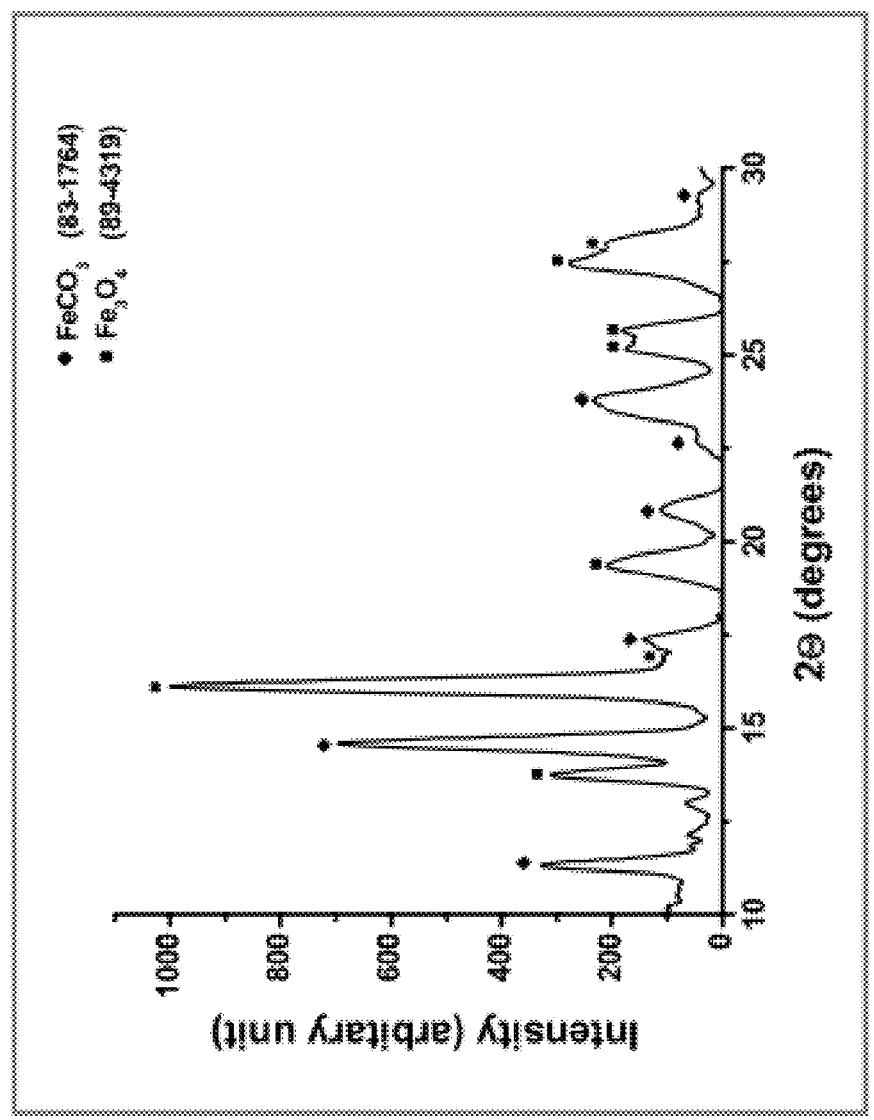
FIG. 3 depicts X-ray diffraction pattern which confirms the siderite formation for reaction [1] done at 100° C., 50 bars and 3 h in accordance with an embodiment of the disclosure.
Figure 5:
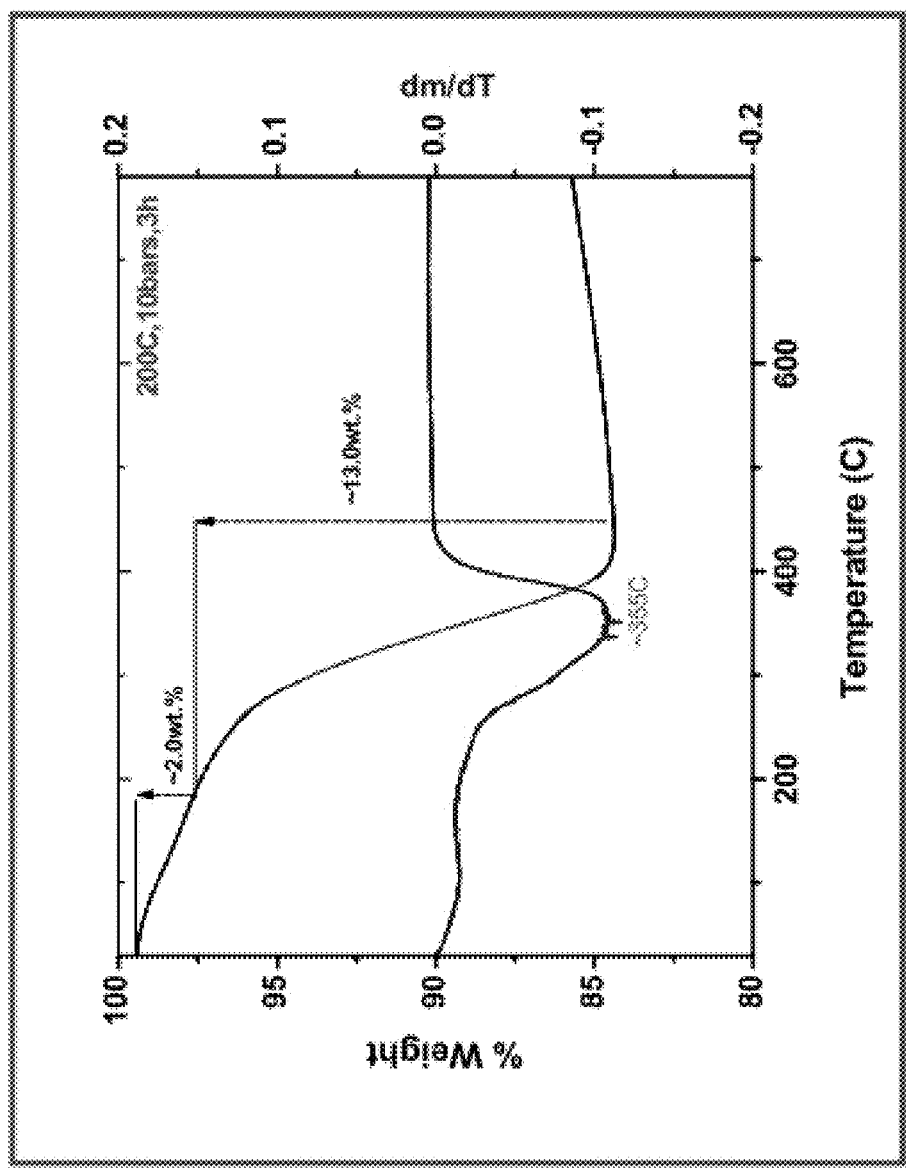
FIG. 5 shows a TG-DTA plot for the product obtained from reaction [1] performed at 200° C., 10 bars and 1 h under air flow rate of 100 ml/min in accordance with an embodiment of the disclosure.
Figure 6:
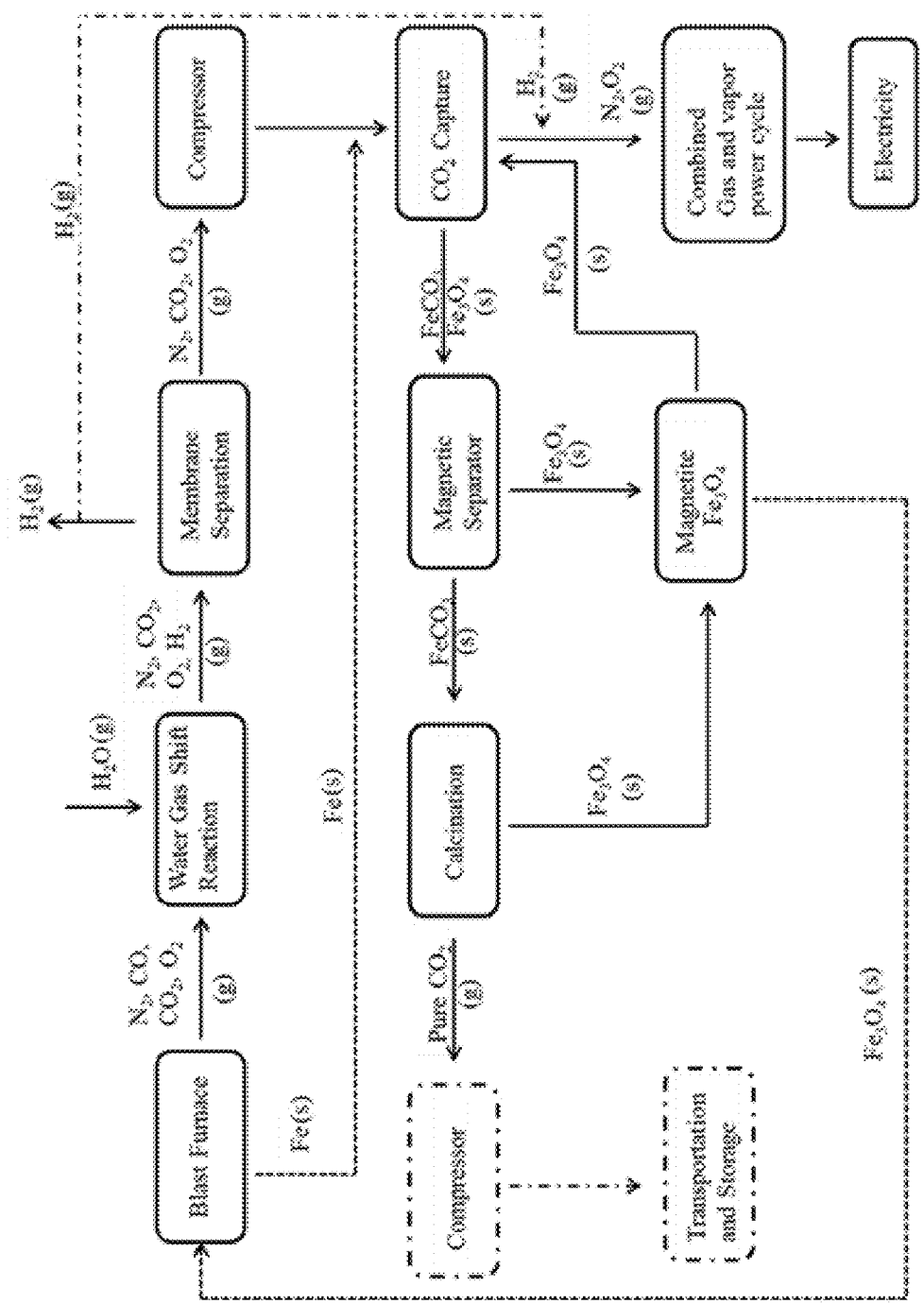
FIG. 6 shows a flow diagram of a carbonation process integrated into a blast furnace in accordance with an embodiment of the disclosure.

In FIG. 3, X-ray diffraction pattern confirms the formation of siderite as a reaction product at 100° C., 50 bars and 3 h. FIG. 4 depicts the experimental results for reaction [1] is shown for different sets of temperature, pressure and time. FIG. 5 illustrates the TG-DTA analysis of product for an experiment done at 200° C. and 10 bars under an air flow rate of 100 ml/min. The dissociation temperature for siderite is noticed at ~355° C. In FIG. 6, there is shown a flow diagram of a carbonation process integrated into a blast furnace.

Embodiments of the disclosure can be used for one or more purposes, including but not limited to, carbon dioxide capture, hydrogen production, and electricity generation. Embodiments of the disclosure can be tailored for use depending on at the needs of a facility. For example, carbon dioxide capture using iron based materials can be beneficial in particular of iron and steel industries, such as those using blast furnaces.

EXAMPLE

Process Integration Analysis

A blast furnace of capacity 6000 ton/day is used. The assumed condition for carbonation reaction for this example are: 200° C., 10 bar, 1 h and efficiency=0.44. It is also assumed that only 10% of carbonation heat is recovered from a carbonation reactor. The calcination of siderite happens at a temperature of 350° C. and the amount of magnetite and iron needed to capture $CO_2$ (after water gas-shift reaction) is 391.28 and 94.37 t/h respectively. The iron is not manufactured at the site and is required to be purchased at a rate of \$1400/ton (100 mesh size) and \$3300/ton (325 mesh size). The produced hydrogen is sold at a rate of \$2000/ton. The combined gas and steam power cycle is utilized for electricity production. Natural gas is considered as a fuel for the gas turbine.

The calculated net absorption capacity for the system equals to 0.4912 t $CO_2$/t $Fe_3O_4$. All $CO_2$ sources are taken into account. In this example, the required energy is significantly reduced to almost half as compared to that of MEA solvent absorption process using the method and system in accordance with an embodiment of the disclosure. Also, the calculation shows that after the second cycle of carbon capture, there is a profit of about \$283 and \$694 t/$CO_2$-h for 325 and 100 mesh size iron powders respectively (assumption: 25% of pure $CO_2$ market is available and the rest 75% is compressed to 136 bars and sequestered underground). This translates to a profit of about \$2.5 and \$6.2 million annually for 325 and 100 mesh size particles respectively. Pure $CO_2$ finds applications in several fields such as, for example, food processing industry, carbonated beverages, chemical industries, metal fabrication, oil recovery in the field of petroleum etc. Thus, pure $CO_2$ has definitely has a huge market. No transportation or storage cost of rest 75% $CO_2$ are considered for the profit calculations made herein. However, its compression cost has been included. This demonstrates the ability of embodiments of the method and system to be integrated to any iron making industry.

EXAMPLE

Blast Furnace Capture using Magnetite and Iron Mixture (Mass Balance)

Assuming blast furnace gas has a flow rate of 1 t/h. Then, $N_2$=0.5 t/h, CO=0.23 t/h, $CO_2$=0.25 t/h, $O_2$=0.02 t/h.

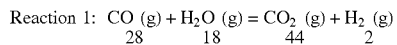

0.23 t CO will produce=((44/28)*0.23 t)$CO_2$=0.36 t $CO_2$
0.23 t CO will produce=((2/28)*0.23 t) $H_2$=0.0165 t $H_2$ Now, after reaction 1, the composition of gaseous stream is: $N_2$=0.5 t/h; $CO_2$=(0.25+0.36) t/h=0.61 t/h; $H_2$=0.0165 t/h; $O_2$=0.02 t/h Hydrogen can be separated using diaphragm. Then, the gaseous stream is flown through Carbonation reactor.

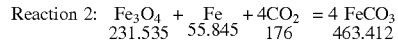

To capture 0.61 t/h $CO_2$=((231.535/176)*0.61 t) $Fe_3O_4$ needed=0.8025 t/h $Fe_3O_4$ needed
To capture 0.61 t/h $CO_2$=((55.845/176)*0.61 t) Fe needed=0.1935 t/h Fe needed
This reaction will produce=((463.412/176)*0.61 t) $FeCO_3$ produced=1.606 t/h $FeCO_3$ produced

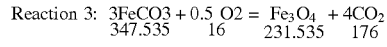

1.606 t/h $FeCO_3$ decomposes to produce=((231.535/347.535)*1.606 t) $Fe_3O_4$=1.07 t/h $Fe_3O_4$
1.606 t/h $FeCO_3$ decomposes to produce=((176/347.535)*1.606 t) pure $CO_2$=0.8133 t/h pure $CO_2$
Out of 1.07 t/h $Fe_3O_4$, 0.8025 t/h $Fe_3O_4$ will be sent back for reaction 2. The left=(1.07−0.8025)t/h $Fe_3O_4$=0.2675 t/h $Fe_3O_4$ will be sent to the blast furnace to get fresh Fe.

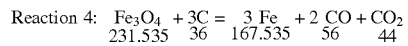

0.2675 t/h $Fe_3O_4$ will produce=((167.535/231.535)*0.2675))t/h Fe=0.1935 t/h Fe produced
0.2675 t/h $Fe_3O_4$ will produce=((56/231.535)*0.2675))t/h CO=0.0647 t/h CO
0.2675 t/h $Fe_3O_4$ will produce=((44/231.535)*0.2675))t/h $CO_2$=0.0508 t/h $CO_2$
Thus, overall $CO_2$ captured=(0.8133−0.0508) t/h=0.7624 t/h $CO_2$ captured.
Energy Balance calculation:

| Re-action | Amount in t | Number of moles | Temp C. | Enthalpy (kJ/mol) | MJ | kWh |
|---|---|---|---|---|---|---|
| 1. | 0.23 | 8214.286 | 500 | −34.5 | −283.3929 | −78.72 |
| 2. | 0.61 | 3465.999 | 200, 10 bars | −288.54 | −1000.079 | −277.80 |
| 3. | 1.606 | 13863.35 | 400 | 35.18 | 487.7127 | 135.4757 |
| 4. | 0.2675 | 1155.333 | 800 | 674 | 778.6944 | 216.304 |

4.74
If only 20% of heat recovered, then overall heat requirement=217.5 kWh

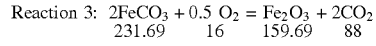

1.606 t/h $FeCO_3$ decomposes to produce=((159.69/231.69) 1.606 t) $Fe_2O_3$=1.107 t/h $Fe_2O_3$
1.606 t/h $FeCO_3$ decomposes to produce=((88/231.69)* 1.606 t) pure $CO_2$=0.6099 t/h pure $CO_2$ 1.107 t/h $Fe_2O_3$ will be sent back for reaction 2.

$Fe2O3+2C=2Fe+CO+CO2$ 1.107/h $Fe_3O_4$ will produce=((44/159.69)*1.107))t/h $CO_2$=0.305 t/h $CO_2$ 1.107/h $Fe_3O_4$ will produce=((28/159.69)*1.107))t/h $CO_2$=0.194 t/h CO Embodiments of the disclosure can have one or more of the following advantageous features:

(1) Raw Materials

The raw materials needed to capture $CO_2$ gas are magnetite and iron. These materials are readily accessible at a blast furnace site. They generally do not have harmful effects unlike MEA solvents and can be easily handled. These raw materials too can be used for a large number of cycles to absorb $CO_2$ gas. Once the materials adsorption capacity degrades, it can be converted back into iron. The raw materials can have a high adsorption capacity, for example, of about 0.7624(ton$CO_2$/ton$Fe_3O_4$) compared to 0.4(ton$CO_2$/tonMEA).

(2) Hydrogen Gas Production

Since blast furnace has an equal proportion of CO and $CO_2$ gas, it is desirable to have a water gas shift reactor. Water gas shift reaction is a known process to produce pure hydrogen gas. In various embodiments, the raw material, such as magnetite magnetite, can also work as a catalyst for the water gas shift reaction. Pure hydrogen gas can be sold for $1600-1800/ton. Thus, embodiments of the disclosure can have the added benefit of producing a sellable commodity.

(3) Combined Gas and Vapor Power Cycle

In various embodiments, the gases coming out of the carbonation reactor will be mainly heated and pressurized nitrogen and oxygen gases. These gases can be fed in a combined gas and vapor power cycle. Thus, in some embodiments, electricity can be produced at the same site. The design of some embodiments also permits to route the produced hydrogen gas into the combined gas and vapor power cycle and thus lead to an enhanced efficiency for the turbines.

(4) Exothermic Carbonation Reaction

The carbonation reaction is exothermic in nature. The produced heat can be utilized to generate steam in various embodiments. The generated steam can be passed into the water gas shift reactor to make hydrogen gas. This will partly supply the amount of steam needed to run the water gas shift reaction. Thus, it can save energy.

(5) Less Transportation Cost

Since raw materials are readily accessible at a blast furnace site, there methods and systems of the disclosure can eliminate the need for extra transportation to deliver raw materials, which can ultimately reduce prices. Conventional technologies need raw materials to be transported at the site, which not only increase the cost but also emit significant amount of $CO_2$ gas during the transportation process.

(6) No External Energy Supply Needed

The calcination reaction requires energy. In embodiments of the disclosure, the energy requirement can be fulfilled by either using non-fossil energy sources (nuclear, hydro, solar or wind) or electricity produced by using combined gas and vapor power cycles. Thus, unlike other conventional technologies, the methods of the disclosure can reduce or even eliminate the need to purchase any electricity or source of electricity.

(7) No Chemical Pretreatment Steps and No Chemical Wastes

The proposed reaction uses solids (magnetite and iron) as an adsorbent for $CO_2$ gas. They do not require any chemical pretreatment process (unlike MEA) and can be used as mined. After, several cycles of carbonation and calcination process, the raw materials can be again fed back in the blast furnace to get fresh iron. Thus, the methods of the disclosure can reduce or eliminate the loss of raw materials. Moreover, unlike other chemical scrubbing technologies, the methods of disclosure in various embodiments will not produce any chemical wastes.

(8) Production of Pure CO2 Gas

There is a production of pure $CO_2$ gas in the embodiments of the disclosure. Pure $CO_2$ gas has a variety of applications in various chemical industries. Thus, instead of compressing and liquefying pure $CO_2$ gas, it can either be sold to the chemical industries for various purposes.

Further advantages of embodiments of the disclosure can include its ability to be easily integrated to any conventional blast furnaces. It can also reduce the $CO_2$ capture cost, for example, by a factor of 2-3.

Apart from just capturing $CO_2$ gas, embodiments of the proposed integration process can be used to generate hydrogen gas as well as electricity (using for example combined gas and vapor power turbines) at the same spot. The hydrogen gas can potentially be sold, for example, and, for example, the generated electricity can be utilized for function of the different processes at the site or can be sent to the grid for further use.

In contrast to conventional methods, which often use expensive raw materials and involve various costs like transportation, material handling etc., embodiments of the disclosed method utilize raw materials that are readily available, for example, readily available at the industrial site, which can eliminate transportation and handling costs. Embodiments of the disclosure for $CO_2$ gas capture also does not produce any kind of chemical wastes.

This technology can provide a significant benefit to the Iron making industries. The average cost for capturing 1 ton of $CO_2$ gas is around $45-60 and also has a massive energy penalty. Therefore, it is highly desirable for Iron industries to reduce the economic and energy loss for capturing $CO_2$ gas. However, this embodiments of the disclosure can severely cut down the involved cost for $CO_2$ gas capture and can also provide valuable hydrogen gas and electricity. In some embodiments, the required energy to run the proposed reaction can be provided by the integration of a combined gas and steam turbines. Thus, this will not require much of the external power supply. Also, the raw materials to be used in various embodiments can be considered as almost "free" and will be utilized for a number of cycles.

Although the disclosed subject matter has been described and depicted with respect to several embodiments thereof, it should be understood by those skilled in the art that features of the disclosed embodiments can be combined, rearranged etc. to produce additional embodiments within the scope of the invention, and that various other changes, omissions, and additions may be made therein and thereto, without parting from the spirit and scope of the present invention.

What is claimed is:

1. A system for sequestering carbon dioxide, comprising: a carbonation reactor having a port for receiving a hot pressurized gaseous stream of $CO_2$ and $N_2$, wherein the carbonation reactor comprises a reaction mixture comprising (i) magnetite and iron, (ii) wustite, or (iii) hematite and iron, wherein the reaction mixture reacts with the hot pressurized gaseous stream received through the port to produce producing siderite and an unreacted mixture, the unreacted mixture selected from the group consisting of magnetite and iron, wustite, and hematite and iron;

a magnetic separator coupled to the carbonation reactor, the magnetic separator receiving the siderite and the unreacted mixture from the carbonation reactor and separating the siderite and- from the unreacted mixture;

a calciner, the calciner receiving the siderite from the magnetic separator and decomposing the siderite to produce produces magnetite or hematite, and CO2.

2. A system as defined in claim 1, wherein the hot pressurized gaseous stream is provided by a compressor.

3. A system as defined in claim 1, wherein the carbonation reactor produces a $CO_2$ lean pressurized hot gaseous stream.

4. A system as defined in claim 3, wherein the $CO_2$ lean pressurized hot gaseous stream is used to generate energy.

5. A system as defined in claim 4, wherein the energy is produced by a gas or steam turbine.

6. The system of claim 1, wherein the hot pressurized gaseous stream of $CO_2$ and $N_2$ is blast furnace gas.

7. The system of claim 1, further comprising a water gas shift reactor coupled to the carbonation reactor.

8. A system for sequestering carbon dioxide, comprising:
a carbonation reactor comprising a reaction mixture and a port for receiving a hot pressurized gaseous stream of $CO_2$ and $N_2$, wherein the reaction mixture comprises magnetite and reacts with the gaseous stream to produce siderite and an unreacted mixture comprising magnetite;

a magnetic separator coupled to the carbonation reactor for receiving the siderite and unreacted mixture from the carbonation reactor and separating the siderite from the unreacted mixture;

a calciner adapted to receive the siderite from the magnetic separator and decompose the siderite to produce $CO_2$ and one or more of magnetite and hematite.

9. The system of claim 8, wherein the reaction mixture further comprises iron.

10. The system of claim 8, wherein the hot pressurized gaseous stream of $CO_2$ and $N_2$ is blast furnace gas.

11. The system of claim 8, further comprising a water gas shift reactor coupled to the carbonation reactor.

12. The system of claim 8, wherein the carbonation reactor produces a $CO_2$ lean pressurized hot gaseous stream.

13. The system of claim 12, wherein the $CO_2$ lean pressurized hot gaseous stream is used to generate energy.

14. A method for sequestering carbon dioxide using the system of claim 1, comprising: passing a hot and pressurized gaseous stream of $CO_2$ and $N_2$ through the carbonation reactor and forming carbonate ions and forming iron based carbonates.

* * * * *

UNITED STATES PATENT AND TRADEMARK OFFICE
CERTIFICATE OF CORRECTION

PATENT NO. : 9,719,417 B2  
APPLICATION NO. : 14/559699  
DATED : August 1, 2017  
INVENTOR(S) : Sushant Kumar et al.

It is certified that error appears in the above-identified patent and that said Letters Patent is hereby corrected as shown below:

In the Claims

At Column 8, Line 65, "produce producing" should be -- produce --.

At Column 9, Line 4, "and- from" should be -- from --.

At Column 9, Line 7, "produce produces" should be -- produce --.

At Column 9, Line 8, "A system" should be -- The system --.

At Column 9, Line 10, "A system" should be -- The system --.

At Column 9, Line 12, "A system" should be -- The system --.

At Column 9, Line 13, "A system" should be -- The system --.

Signed and Sealed this  
Tenth Day of April, 2018

Andrei Iancu  
*Director of the United States Patent and Trademark Office*